(12) United States Patent
Dayot et al.

(10) Patent No.: US 11,067,115 B2
(45) Date of Patent: Jul. 20, 2021

(54) SPHERICAL BALL JOINT

(71) Applicant: SKF Aerospace France S.A.S, Montigny-le-Bretonneux (FR)

(72) Inventors: Camille Dayot, Valence (FR); Jean-Philippe Deprugney, Beauchastel (FR); Christophe Domps, Bourg-de-Péage (FR); Vincent Guyard, Assieu (FR); Aiouba Omar, Valence (FR)

(73) Assignee: SKF Aerospace France S.A.S

( * ) Notice: Subject to any disclaimer, the term of this patent is extended or adjusted under 35 U.S.C. 154(b) by 0 days.

(21) Appl. No.: 16/783,309

(22) Filed: Feb. 6, 2020

(65) Prior Publication Data

US 2020/0300295 A1    Sep. 24, 2020

(30) Foreign Application Priority Data

Mar. 18, 2019 (FR) ..................... 1902742

(51) Int. Cl.
*F16C 11/06* (2006.01)
*F16C 23/04* (2006.01)
*F16C 33/08* (2006.01)

(52) U.S. Cl.
CPC ...... *F16C 11/0609* (2013.01); *F16C 11/0685* (2013.01); *F16C 23/043* (2013.01); *F16C 23/046* (2013.01); *F16C 33/08* (2013.01); *F16C 11/0614* (2013.01); *F16C 2226/12* (2013.01); *F16C 2226/60* (2013.01)

(58) Field of Classification Search
CPC ... F16C 11/06; F16C 11/0609; F16C 11/0614; F16C 23/045; F16C 23/046; F16C 33/06; F16C 33/08; F16C 2226/60; F16C 2226/52; F16C 11/0604; F16C 11/0685; F16C 43/02; F16C 2220/40; F16C 2220/42; F16C 2226/12; F16C 2226/70
See application file for complete search history.

(56) References Cited

U.S. PATENT DOCUMENTS

| 3,765,733 | A | 10/1973 | Hackman |
| 3,915,518 | A | 10/1975 | McCloskey |
| 4,077,681 | A | 3/1978 | McCloskey |
| 4,938,121 | A | 7/1990 | Melchior |
| 5,544,955 | A * | 8/1996 | Wakefield ............... F16C 17/22 384/295 |
| 7,648,282 | B2 * | 1/2010 | Shore ..................... F16C 35/02 384/211 |

(Continued)

FOREIGN PATENT DOCUMENTS

| EP | 1431597 A1 | 6/2004 |
| EP | 2963304 A1 | 1/2016 |

(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A spherical ball joint having an inner ring and an outer ring that cooperate by way of respective truncated spherical contact surfaces, the inner ring having a central bore with a cylindrical bore portion. The spherical ball joint includes a cylindrical sleeve mounted securely in the cylindrical bore portion, the sleeve configured to be mounted around a shaft, the sleeve being made of a wear-resistant material different from that of the inner ring.

11 Claims, 7 Drawing Sheets

(56) References Cited

U.S. PATENT DOCUMENTS

| | | | |
|---|---|---|---|
| 2006/0051160 A1* | 3/2006 | Sun | F16C 11/069 |
| | | | 403/122 |
| 2016/0097425 A1* | 4/2016 | Charmillot | F16C 33/60 |
| | | | 384/570 |
| 2017/0159720 A1 | 6/2017 | Armbruster et al. | |
| 2018/0216659 A1* | 8/2018 | Hoppert | F16C 11/083 |
| 2018/0363697 A1 | 12/2018 | Merg et al. | |
| 2018/0363704 A1* | 12/2018 | Coombe | F16C 33/1065 |
| 2020/0072281 A1* | 3/2020 | Hagiwara | F16C 33/581 |

FOREIGN PATENT DOCUMENTS

| | | |
|---|---|---|
| EP | 3418593 A1 | 12/2018 |
| FR | 1089717 A | 3/1955 |
| FR | 2849124 A1 | 6/2004 |
| WO | 2008/008471 A1 | 1/2008 |

\* cited by examiner

[Fig 1]
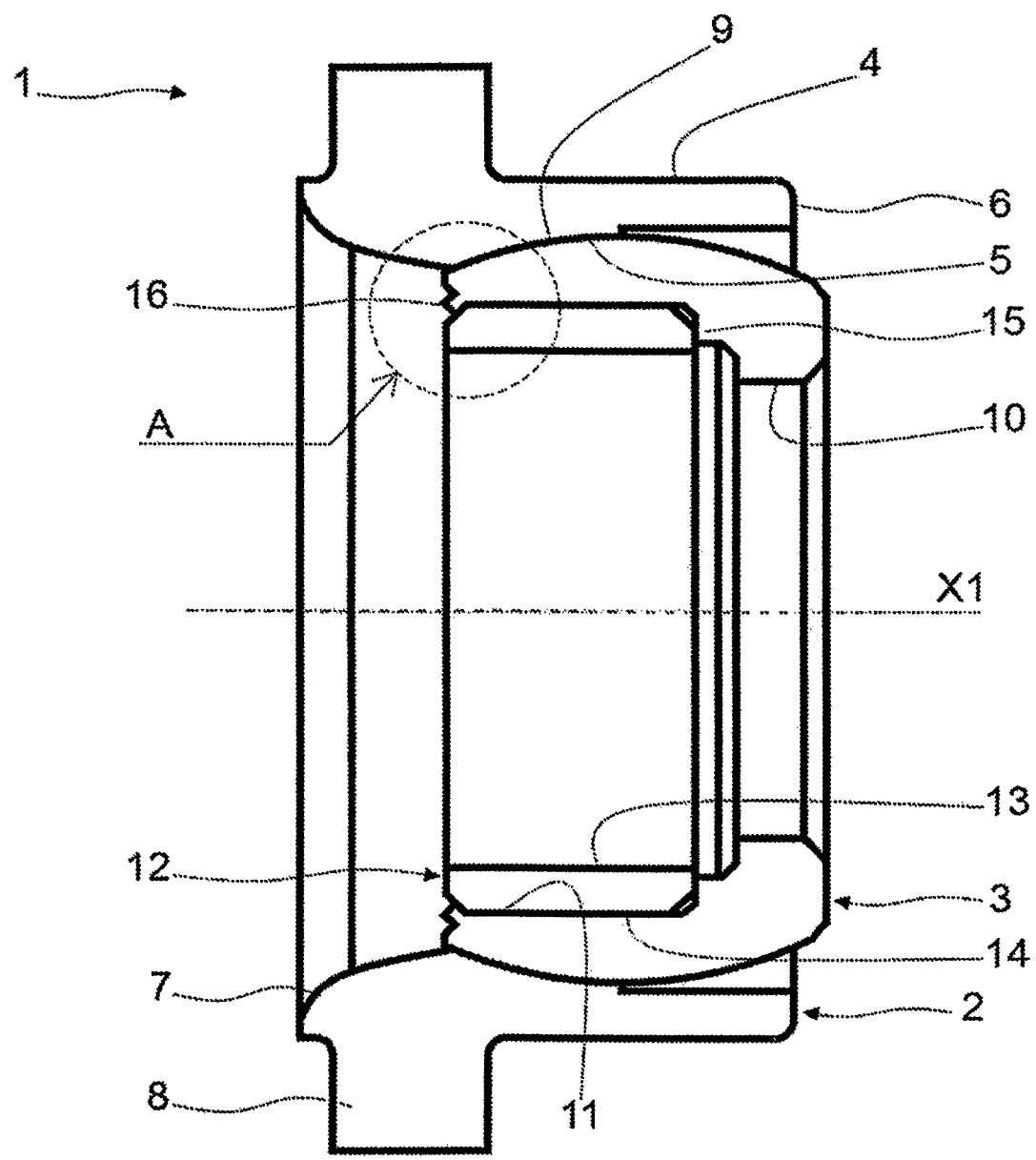

[Fig 2]
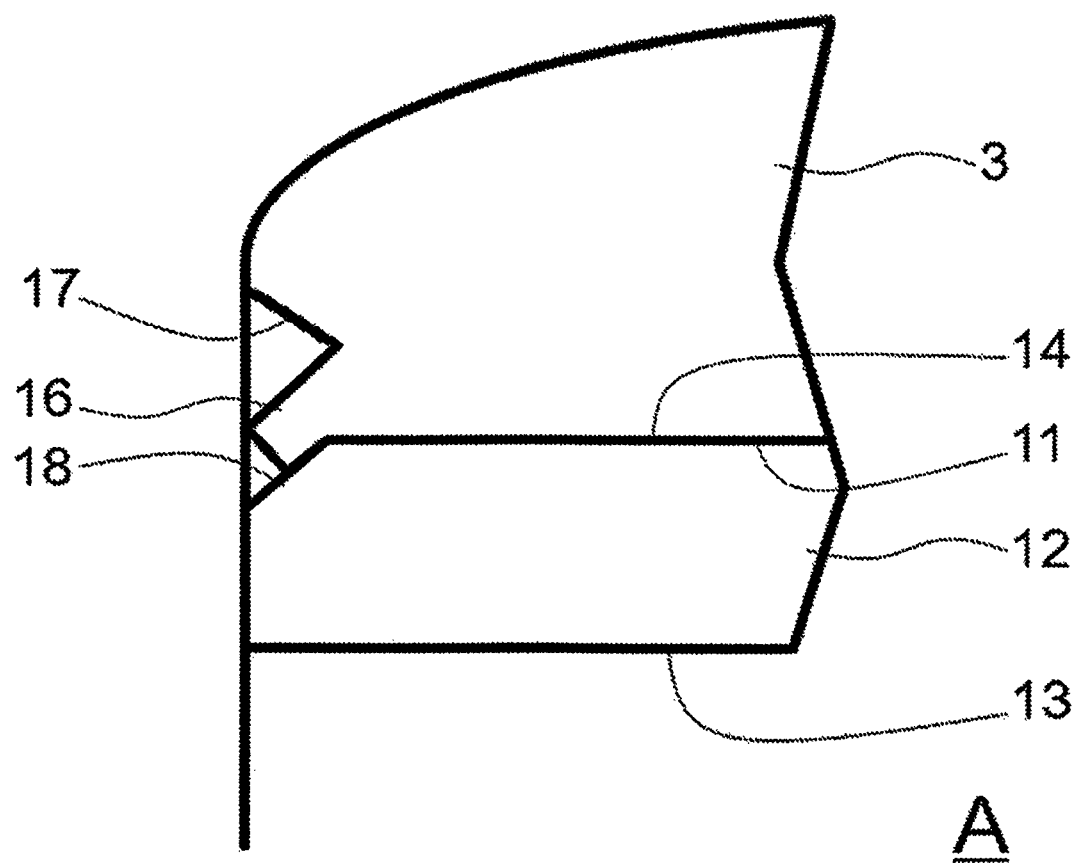

[Fig 3]
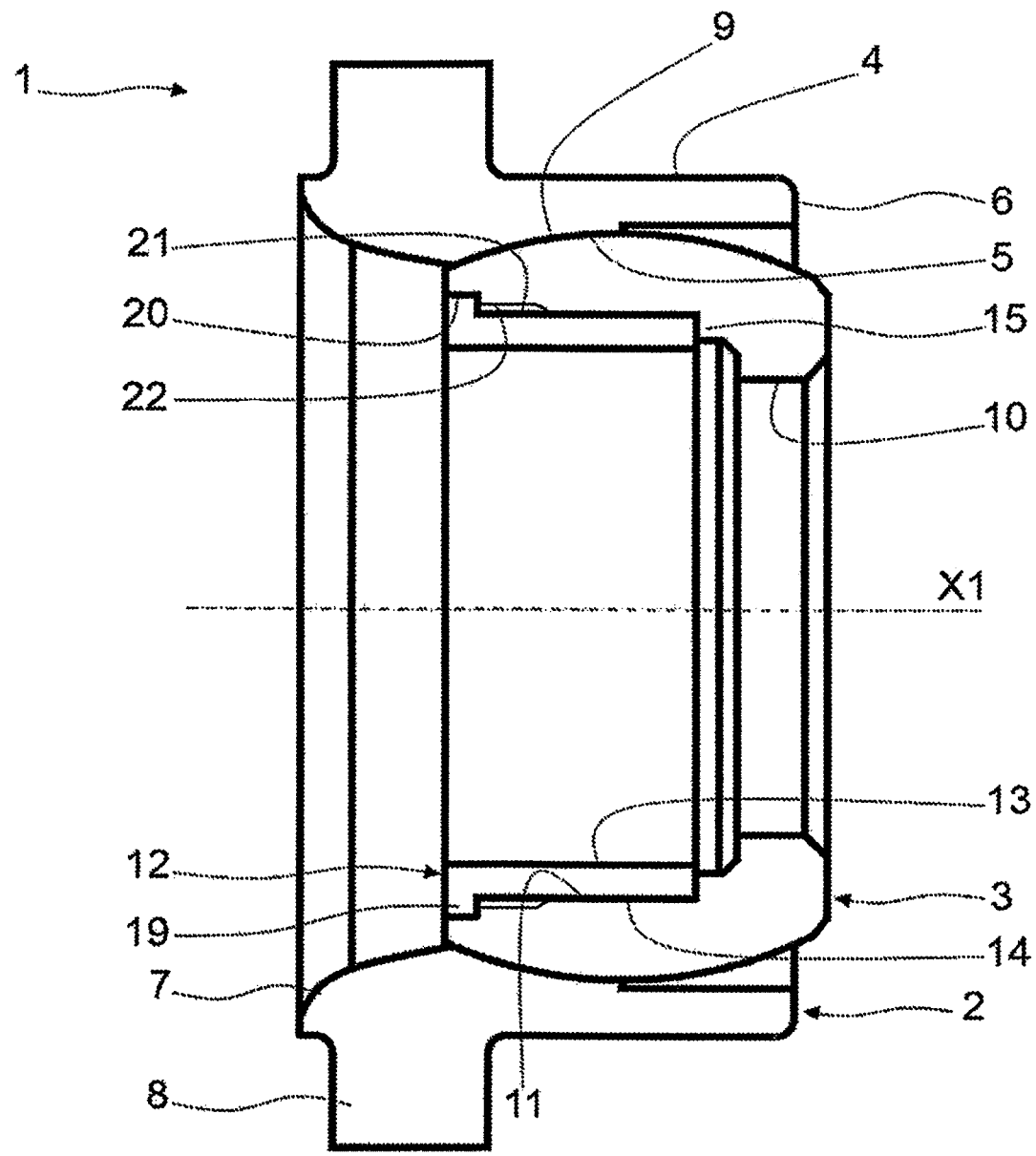

[Fig 4]
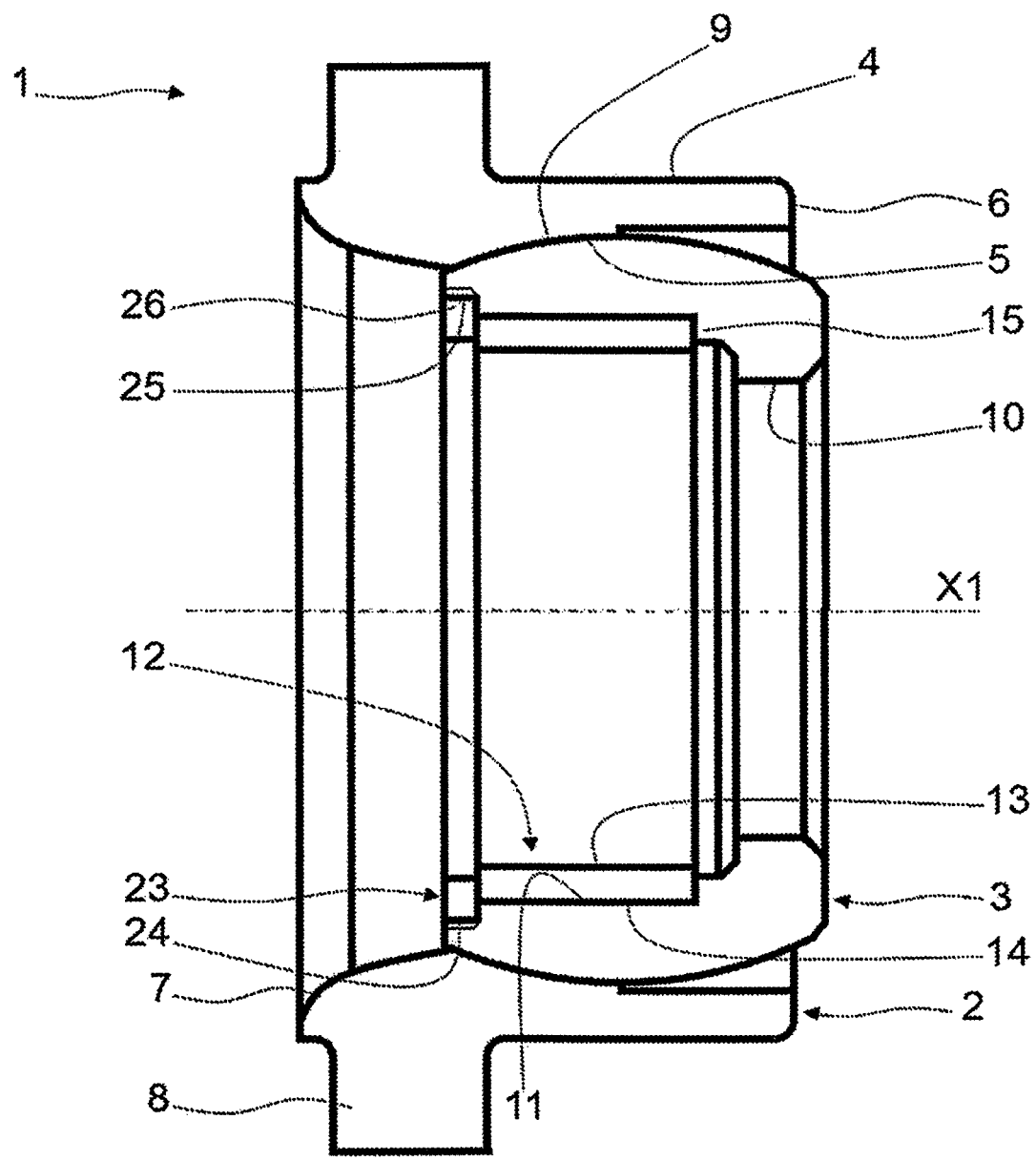

[Fig 5]
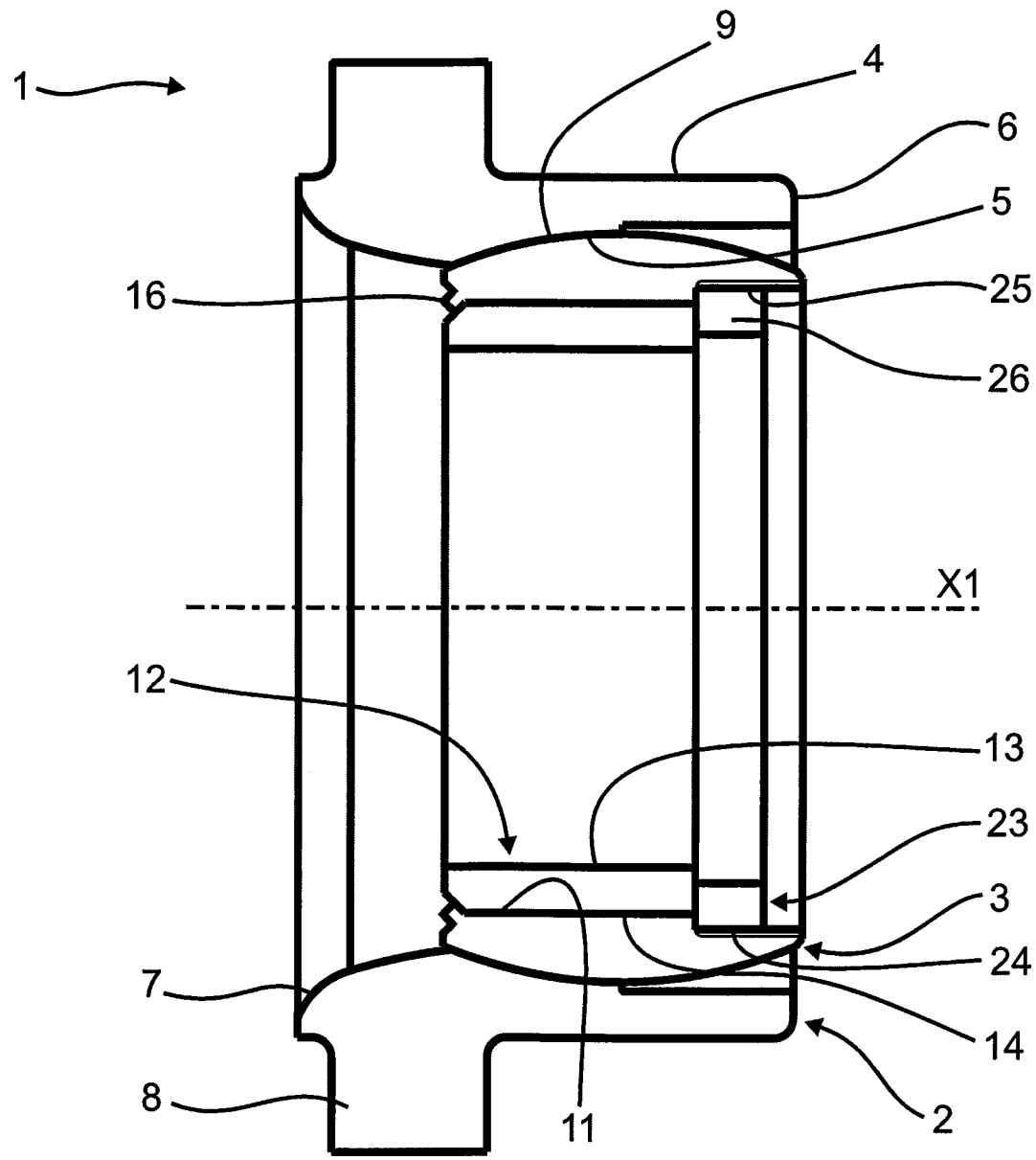

[Fig 6]
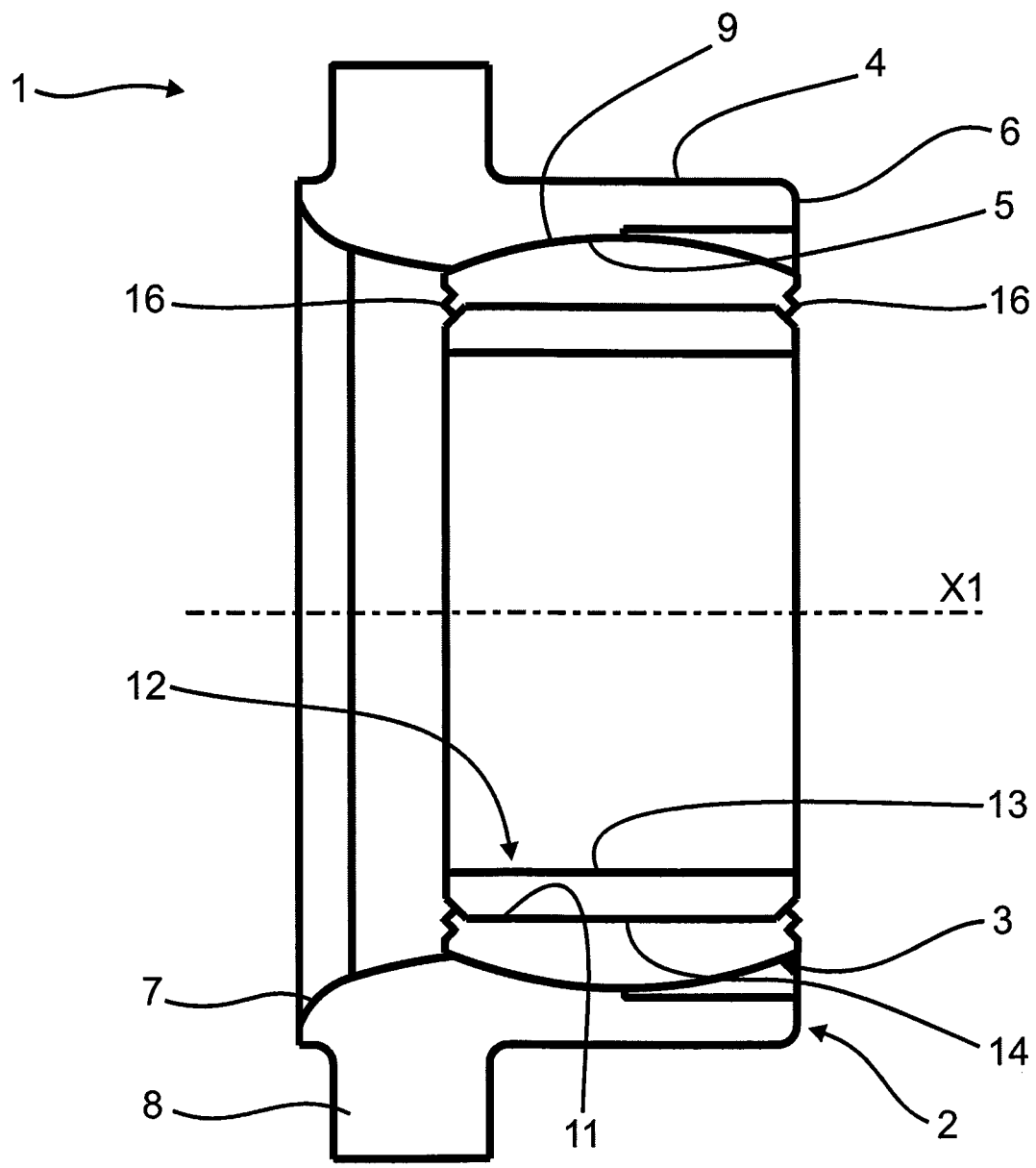

[Fig 7]
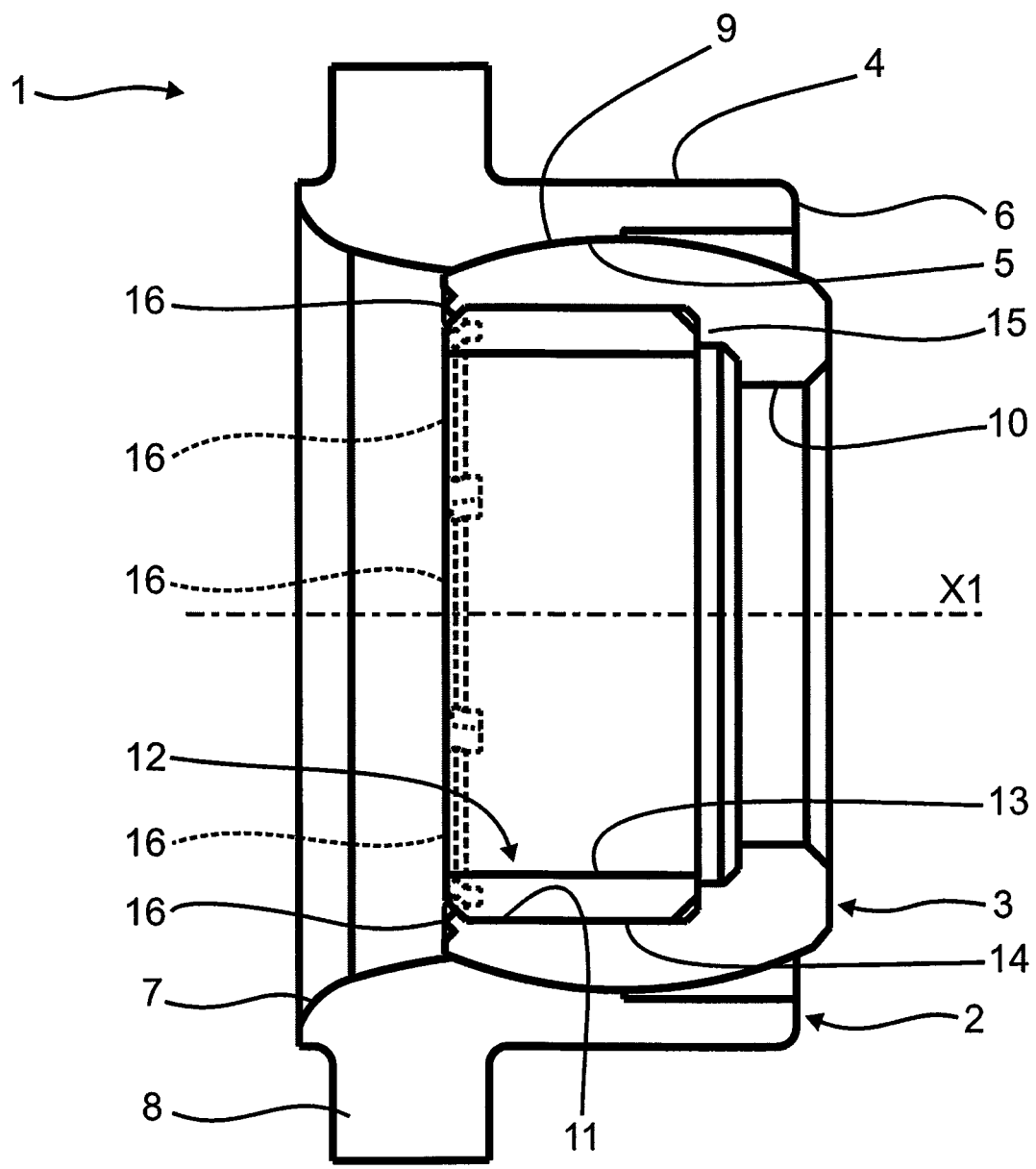

SPHERICAL BALL JOINT

CROSS-REFERENCE TO RELATED APPLICATIONS

This application claims priority to French Patent Application no. 1902742, filed Mar. 18, 2019, the contents of which are fully incorporated herein by reference.

TECHNICAL FIELD OF THE INVENTION

The present invention relates to a ball joint coupling, in particular a spherical ball joint, that operates at temperature and is subjected to radial and axial fatigue loads, and allows three degrees of rotational freedom under near-static conditions and one degree of freedom in translational movement under dynamic conditions, and incorporates a directional stop system.

BACKGROUND OF THE INVENTION

Metal ball joints are used in particular in the aeronautical industry to prevent a member, such as a link rod, from moving in translation with respect to a structural part of the construction, while allowing the relative movement thereof in rotation.

As is known, such a spherical ball joint comprises an inner ring provided with a truncated spherical outer surface, thereby defining two side walls that are able to cooperate with a corresponding inner surface of an outer ring. The inner ring and the outer ring have three mutual degrees of rotational freedom under near-static conditions, while they are secured together in terms of translational movement under dynamic conditions.

This inner ring has an inner surface designed to be mounted on a shaft. However, relative micro-movements between the inner ring and the shaft can arise during use under static or near-static conditions, and these can bring about fretting wear. Larger relative movements can be observed during use under dynamic conditions, and these can bring about premature wearing of the contact surfaces between the inner ring and the shaft, and thus impairment of the mechanical connection between these elements. The efficiency of the mechanical ball joint is affected thereby, and its service life is reduced.

In this regard, it is known to provide, on the inner surface of the metal inner ring, mechanical retention means, in particular grooves that cooperate with splines provided on the outer surface of the shaft. This solution is very effective for preventing any relative rotational movement between the inner ring and the shaft, but does not allow a secure axial hold.

Another solution that has been envisaged is the use of specific materials for the constituent elements of the ball joint. The outer ring and the shaft are each made of nickel alloy, the mechanical properties of which make it possible to ensure the integrity of the coupling subjected to fatigue loads. The metal inner ring is made entirely of copper alloy, the tribological properties of which make it possible to prevent wearing of the shaft and of the outer ring. This material ensures reduced wear and improved integrity of the shaft. However, in addition to the relatively high material and manufacturing costs, such a ring proves to have less good structural integrity with respect to fatigue and a reduced load-bearing capacity compared with a conventional ball joint inner ring. The copper alloy has a sacrificial role, the local wearing of the ring being able to amount to as much as 200 µm. Moreover, differences in thermal expansion between nickel alloys and copper alloys cause a change in clearances, this having a detrimental effect on the cooperation between the shaft and the inner ring.

It is also known to apply a bronze surface coating to the inner surface forming the connection to the shaft. Although this solution is more advantageous in terms of costs and structure, it has the drawback of having a relatively thin thickness of bronze and thus of limiting the maximum wear capacity. Moreover, the geometry of the ring limits the effectiveness of deposition processes, and problems of adhesion and cohesion of the bronze surface coating with the inner surface of the metal inner ring make this solution particularly difficult to implement.

SUMMARY OF THE INVENTION

The present invention aims to remedy the abovementioned drawbacks.

More particularly, the present invention aims to provide a spherical ball joint that is particularly economical, is easy and safe to mount, and ensures optimal efficiency for an extended service life.

The invention relates to a spherical ball joint comprising an inner ring and an outer ring that cooperate by way of respective truncated spherical contact surfaces, the inner ring having a central bore with a cylindrical bore portion.

According to the invention, the spherical ball joint also comprises a cylindrical sleeve mounted securely in the cylindrical bore portion, the sleeve being intended to be mounted around a shaft, the sleeve being made of a wear-resistant material different from that of the inner ring.

By virtue of the invention, the sleeve is secured to the inner ring and follows all the movements thereof. The sleeve forms a retaining interface between the inner ring and the shaft. The sleeve is formed from a wear-resistant material and ensures a reliable and durable mechanical connection to the shaft. The inner ring is not subject to direct wear with the shaft. The sleeve can be made of a less expensive material than that of the inner ring, but the sleeve still has relatively modest dimensions compared with the inner ring.

According to further advantageous but non-essential features of the invention, such a joint can also include the following features, taken on their own or in any technically feasible combination:

The inner ring is formed in one piece.
The inner ring is made of metal.
The inner ring is made of steel, titanium alloy or nickel alloy.
The sleeve is made of metal.
The sleeve is made of copper alloy.
The outer ring is made of metal.
The outer ring is made of steel, titanium alloy or nickel alloy.
The outer ring is made of composite material.
The sleeve has a cylindrical outer surface mounted tightly in the cylindrical bore portion of the inner ring.
The sleeve is mounted tightly by way of a thermal expansion process.
The sleeve is mounted tightly by way of a stamping process.
The ball joint comprises a first mechanical axial retention means for retaining the sleeve in the inner ring in a first axial direction in the sense of insertion of the sleeve into the cylindrical bore portion of the inner ring.
The inner ring comprises a shoulder protruding radially from the central bore thereof towards the interior of the ring, the shoulder axially bounding the cylindrical bore portion and forming a stop for the sleeve in the first axial direction.

The shoulder of the inner ring is annular.

The inside diameter of the shoulder is strictly greater than the inside diameter of the inner surface of the sleeve.

One axial end of the sleeve comprises a lip protruding radially from the outer surface thereof towards the exterior of the sleeve, the lip forming a stop for the sleeve in the first axial direction.

The lip of the sleeve is annular.

The lip of the sleeve is accommodated in a groove formed at one axial end of the inner ring.

The groove in the inner ring is annular.

The ball joint comprises a second mechanical axial retention means for retaining the sleeve in the inner ring in a second axial direction in the opposite sense to the insertion of the sleeve into the cylindrical bore portion of the inner ring.

The spherical ball joint also comprises an annular nut that is fastened to one axial end of the inner ring and forms a stop for the sleeve in the second axial direction.

The nut comprises a threaded outer surface that cooperates with a tapped inner surface of the inner ring.

The nut is accommodated in a tapped annular groove formed at one axial end of the inner ring.

The inside diameter of the nut is strictly greater than the inside diameter of the inner surface of the sleeve.

One axial end of the inner ring comprises at least one deformation portion that forms a retention means for the sleeve in the second axial direction.

The inner ring comprises a plurality of deformation portions.

The deformation portion is annular.

The deformation portion is formed by crimping.

One axial end of the sleeve comprises a chamfer that receives the deformation portion of the inner ring.

The chamfer is annular.

The cylindrical outer surface of the sleeve comprises a threaded portion that cooperates with a corresponding tapped portion of the cylindrical bore portion of the inner ring.

BRIEF DESCRIPTION OF THE FIGURES

The invention will be understood better from reading the following description, which is given purely by way of nonlimiting example.

The description is given with reference to the appended drawings, in which:

FIG. 1 is a view in axial section of a spherical ball joint according to a first embodiment of the invention;

FIG. 2 is a view of the detail A of the spherical ball joint in FIG. 1;

FIG. 3 is a view in axial section of a spherical ball joint according to a second embodiment of the invention; and FIG. 4 is a view in axial section of a spherical ball joint according to a third embodiment of the invention.

FIG. 5 is a view in axial section of a spherical ball joint illustrating an annular nut and deformation portion therein.

FIG. 6 is a view in axial section of a spherical ball joint illustrating a plurality of deformation portions on opposite axial sides of the sleeve.

FIG. 7 is a view in axial section of a spherical ball joint illustrating a plurality of deformation portions along one axial end of the sleeve.

DETAILED DESCRIPTION OF THE INVENTION

FIG. 1 shows a spherical ball joint, referenced 1 overall, of axis X1, and according to a first embodiment of the invention. The spherical ball joint 1 comprises an outer ring 2 and an inner ring 3.

The outer ring 2 has a substantially cylindrical outer surface 4 and a truncated spherical inner surface 5. The inner surface 5 is connected to the outer surface 4 by side walls 6 and 7. The outer ring 2 also comprises a fastening flange 8, known per se, which can advantageously be produced in one piece.

The outer ring 2 may be formed in one piece. The outer ring 2 may be made of metal material, for example titanium, or a composite material, for example including a matrix made of thermoplastic or thermosetting plastics material reinforced with carbon fibres.

The inner ring 3 has an outer surface 9, the truncated spherical profile of which corresponds to that of the inner surface 4 of the outer ring 2. As a result, the inner ring 3 and the outer ring 2 have three degrees of rotational freedom about the axis X1 with respect to one another. The inner ring 3 also has a central bore 10 with a cylindrical bore portion 11.

The inner ring 3 may be formed in one piece. The inner ring 3 is advantageously made of metal material, for example titanium.

According to the invention, the spherical ball joint 1 also comprises a sleeve 12 mounted securely in the cylindrical bore portion 11 of the inner ring 3.

The sleeve 12 has a cylindrical inner surface 13, which is mounted, in use, on an outer surface of a shaft (not shown). The sleeve 12 also has an outer cylindrical surface 14, about which the inner surface of the cylindrical bore portion 11 of the inner ring 3 extends.

The sleeve 12 is made of a wear-resistant material different from that of the inner ring 3. Advantageously, the sleeve 12 is made of metal, for example bronze.

According to a particularly advantageous embodiment, the outer surface 14 of the sleeve 12 is mounted tightly in the cylindrical bore portion 11 of the inner ring 3. The sleeve 12 can be mounted tightly by way of a thermal expansion process. Alternatively, the sleeve 12 can be mounted tightly by way of a stamping process.

According to a particularly advantageous embodiment, the spherical ball joint 1 comprises a first mechanical axial retention means for retaining the sleeve 12 in the inner ring 3 in a first axial direction in the sense of insertion of the sleeve 12 into the cylindrical bore portion 11 of the inner ring 3.

In the embodiment illustrated in FIG. 1, the inner ring 3 comprises a shoulder 15 protruding radially from the central bore 10 thereof towards the interior of the ring 3. The shoulder 15 axially bounds the cylindrical bore portion 11 and forms a stop for the sleeve 12 in the first axial direction. The inside diameter of the shoulder 15 is strictly greater than the inside diameter of the inner surface 13 of the sleeve 12, so as to avoid any direct contact between the shaft mounted in the sleeve 12 and the inner ring 3. Advantageously, the shoulder 12 of the inner ring 3 is annular.

According to a particularly advantageous embodiment, the ball joint 1 comprises a second mechanical axial retention means for retaining the sleeve 12 in the inner ring 3 in a second axial direction in the opposite sense to the insertion of the sleeve 12 into the cylindrical bore portion 11 of the inner ring 3.

In the embodiment illustrated in FIGS. 1 and 2, the axial end by which the sleeve 12 is inserted in the inner ring 3 comprises a deformation portion 16 that forms a retaining means for the sleeve 12 in the second axial direction. Referring to FIGS. 6 and 7, inner ring 3 can have a plurality of circumferentially distributed deformation portions 16, or the deformation portion 16 is annular.

Advantageously, the deformation portion 16 can be formed by crimping. A crimping machine applies a force that locally deforms the material of the end of the inner ring. A recessed zone 17 is formed, by which the material is pushed back so as to form a deformation portion 16. This deformation portion 16 can take the form of a tongue, as illustrated in FIG. 2, or a bulge or any other suitable form.

Advantageously, one axial end of the sleeve 12 comprises an annular chamfer 18 that receives the deformation portion 16 of the inner ring 3. Thus, the material requires less deformation in order to cooperate with a frustoconical surface of the chamfer 18. Moreover, the chamfer 18 and the deformation portion 16 can be configured such that the deformation portion 16 does not extend axially beyond the lateral surface of the end of the sleeve 12. Such an arrangement makes it possible to ensure that the assembly is compact.

In the embodiment illustrated in FIG. 3, the axial end of the sleeve 12 comprises a lip 19 protruding radially from its outer surface 14 towards the exterior of the sleeve 12, the lip 19 forming a stop for the sleeve in the first axial direction. The lip 19 of the sleeve is advantageously annular and is accommodated in an annular groove 20 formed at one axial end of the inner ring 3.

Moreover, the cylindrical outer surface 14 of the sleeve 12 comprises a threaded portion 21 that cooperates with a corresponding tapped portion 22 of the cylindrical bore portion 11 of the inner ring 3.

In the embodiment illustrated in FIG. 4, the spherical ball joint 1 also comprises an annular nut 23 fastened at one axial end of the inner ring 3. The inside diameter of the nut 23 is strictly less than the outside diameter of the outer surface 14 of the sleeve 12 and thus forms a stop for the sleeve 12 in the second axial direction. The inside diameter of the nut 23 is strictly greater than the inside diameter of the inner surface 13 of the sleeve 12, so as to avoid any direct contact between the shaft mounted in the sleeve 12 and the nut 23. Advantageously, the nut 23 comprises a threaded outer surface 24 that cooperates with to tapped inner surface 225 of the inner ring 2, as also shown in FIG. 5. The nut 23 is accommodated in an annular groove 26 formed at one axial end of the inner ring 3. Alternatively, the nut can be securely fastened to the inner ring by any other suitable means, for example by riveting, adhesive bonding or welding.

Furthermore, all or only some of the technical features of the various embodiments can be combined with one another. Thus, the spherical ball joint can be adapted in terms of cost, performance and ease of use.

The invention claimed is:

1. A spherical ball joint having an axis of rotation, the spherical ball joint comprising:
    an inner ring, the inner ring having a central bore defining a cylindrical bore portion, a portion of a radially outer surface of the inner ring forming an inner ring truncated spherical contact surface, the inner ring having a first inner ring axial end which forms a deformation portion,
    a cylindrical sleeve located in the cylindrical bore portion, the cylindrical sleeve being configured to be mounted around a shaft, the cylindrical sleeve being made of a material different from that of the inner ring, the cylindrical sleeve having first and second cylindrical sleeve axial ends, the deformation portion contacting the first cylindrical sleeve axial end to prevent the first cylindrical sleeve axial end from moving axially past the deformation portion, a contact area between the deformation portion and the cylindrical sleeve being askew to the axis of rotation, wherein the deformation portion of the inner ring is configured to retain the cylindrical sleeve in the inner ring to prevent axial movement of the cylindrical sleeve in a direction opposite to a direction of insertion of the cylindrical sleeve into the inner ring,
    wherein a medial portion of the radially inner surface of the inner ring forms a shoulder, the shoulder being configured to engage the second cylindrical sleeve axial end to prevent the cylindrical sleeve from moving axially past the shoulder, and
    an outer ring, a portion of a radially inner surface of the outer ring forming an outer ring truncated spherical contact surface, the outer ring rotates about the axis of rotation relative to the inner ring by the outer ring truncated spherical contact surface sliding on the inner ring truncated spherical contact surface.

2. The spherical ball joint according to claim 1, wherein the cylindrical sleeve is made of copper alloy.

3. The spherical ball joint according to claim 1, wherein the cylindrical sleeve has a cylindrical outer surface mounted in and abutting the cylindrical bore portion of the inner ring.

4. The spherical ball joint according to claim 3, wherein the cylindrical outer surface of the cylindrical sleeve comprises a threaded portion that cooperates with a corresponding tapped portion of the cylindrical bore portion of the inner ring.

5. A spherical ball joint having an axis of rotation, the spherical ball joint comprising:
    an inner ring, the inner ring having a central bore defining a cylindrical bore portion, a portion of a radially outer surface of the inner ring forming an inner ring truncated spherical contact surface, the inner ring having a first inner ring axial end which forms a deformation portion,
    a cylindrical sleeve located in the cylindrical bore portion, the cylindrical sleeve being configured to be mounted around a shaft, the cylindrical sleeve being made of a material different from that of the inner ring, the cylindrical sleeve having first and second cylindrical sleeve axial ends, the deformation portion contacting the first cylindrical sleeve axial end to prevent the first cylindrical sleeve axial end from moving axially past the deformation portion, a contact area between the deformation portion and the cylindrical sleeve being askew to the axis of rotation,
    an outer ring, a portion of a radially inner surface of the outer ring forming an outer ring truncated spherical contact surface, the outer ring rotates about the axis of rotation relative to the inner ring by the outer ring truncated spherical contact surface sliding on the inner ring truncated spherical contact surface; and
    wherein the deformation portion of the spherical ball joint is configured to retain the cylindrical sleeve in the inner ring to prevent axial movement of the cylindrical sleeve in a direction opposite to a direction of insertion of the cylindrical sleeve into the inner ring, wherein the second cylindrical sleeve axial end forms a radially extending axial surface configured to abut a shoulder of the inner ring.

6. The spherical ball joint according to claim 5, wherein a medial portion of the radially inner surface of the inner ring forms the shoulder, the shoulder being configured to engage the second cylindrical sleeve axial end to prevent the cylindrical sleeve from moving axially past the shoulder.

7. A spherical ball joint having an axis of rotation, the spherical ball joint comprising:
- an inner ring, the inner ring having a central bore defining a cylindrical bore portion, a portion of a radially outer surface of the inner ring forming an inner ring truncated spherical contact surface, the inner ring having a first inner ring axial end which forms a deformation portion,
- a cylindrical sleeve located in the cylindrical bore portion, the cylindrical sleeve being configured to be mounted around a shaft, the cylindrical sleeve being made of a material different from that of the inner ring, the cylindrical sleeve having first and second cylindrical sleeve axial ends, the deformation portion contacting the first cylindrical sleeve axial end to prevent the first cylindrical sleeve axial end from moving axially past the deformation portion, a contact area between the deformation portion and the cylindrical sleeve being askew to the axis of rotation, an outer ring, a portion of a radially inner surface of the outer ring forming an outer ring truncated spherical contact surface, the outer ring rotates about the axis of rotation relative to the inner ring by the outer ring truncated spherical contact surface sliding on the inner ring truncated spherical contact surface,
- wherein the inner ring has a second inner ring axial end which axially protrudes outside the outer ring, and,
- wherein the spherical ball joint further comprises an annular nut fastened to the inner ring to form an axial stop for the cylindrical sleeve.

8. The spherical ball joint according to claim 7, wherein the annular nut comprises a threaded outer surface that cooperates with a tapped inner surface of the inner ring.

9. The spherical ball joint according to claim 7, wherein the first inner ring axial end comprises the deformation portion and a plurality of deformation portions which retains the cylindrical sleeve in the inner ring.

10. The spherical ball joint according to claim 9, wherein the deformation portion is formed by crimping.

11. The spherical ball joint according to claim 9, wherein the first cylindrical sleeve axial end comprises a chamfer that abuts the deformation portion of the inner ring.

* * * * *